United States Patent [19]

Huntington

[11] 3,716,167

[45] Feb. 13, 1973

[54] ROTARY SAMPLE COLLECTOR

[75] Inventor: Fred R. Huntington, Salt Lake City, Utah

[73] Assignee: The Galigher Company, Salt Lake, Utah

[22] Filed: March 15, 1971

[21] Appl. No.: 123,996

[52] U.S. Cl. .....................222/63, 222/168, 222/478
[51] Int. Cl. ..............................................B67d 5/08
[58] Field of Search...222/168, 168.5, 461, 330, 162, 222/485, 486, 63, 478, 460, 462; 111/74

[56] References Cited

UNITED STATES PATENTS

| | | | |
|---|---|---|---|
| 2,772,032 | 11/1956 | Pattillo | 222/330 |
| 3,162,153 | 12/1964 | Schulz, Jr. | 222/168.5 X |
| 2,775,371 | 12/1956 | Isserlis | 222/168 |
| 2,848,019 | 8/1958 | Corbin et al. | 222/63 X |

Primary Examiner—Robert B. Reeves
Assistant Examiner—John P. Shannon
Attorney—William S. Britt, Harvey Gold and David V. Trask

[57] ABSTRACT

A rotary sample collector for receiving periodically collected samples of dry, granular materials is the subject of this disclosure. The collector comprises a cylindrical closure containing a rotatable, inverted cone-shaped hopper into which sample material is introduced to be discharged at the cone apex through an inclined conduit to one of a plurality of collection stations. The collection stations are disposed in a circle about the base of the collector, each station having a tubular member which communicates with the inclined conduit upon rotation of the cone-shaped hopper to sequentially align the lower opening of the inclined conduit with the upper opening of each tubular member of each collecting station.

12 Claims, 4 Drawing Figures

INVENTOR
FRED R. HUNTINGTON

BY *William S. Britt*

ATTORNEY

ROTARY SAMPLE COLLECTOR

OBJECTS OF THE INVENTION

It is an object of the invention to provide a rotary sample collector for periodic sampling of dry granular material.

It is a further object of this invention to provide a rotary sample collector having a plurality of collection stations with each station sequentially provided with periodically collected material.

Other objects of the invention include provision of rotating sealing means to isolate collection stations and drive means for rotating and supporting a cone-shaped hopper for intermediate collection and distribution to a pre-selected collection station.

DESCRIPTION OF INVENTION

A rotary sample collector for receiving periodically collected samples of dry granular material and distributing same to one of a plurality of collection stations has been invented. The collector comprises an outer, vertical, cylindrical closure and an inner, inverted cone-shaped hopper which receives periodically collected samples and distributes same downwardly through an inclined conduit attached to the cone apex to one of a plurality of collection stations located beneath the base of the cylindrical closure.

The collection stations are disposed in a circle under the base of the cylindrical closure and communicate with the discharge end of the inclined conduit through spaced openings in the base. The openings in said base are covered with a flat, disc seal which covers all of said openings except the sequentially selected opening allowing collected material to flow from the inclined conduit to a collection station.

The inverted cone-shaped hopper is supported by a vertical drive shaft which is concentrically located with reference to the cone, said shaft rotated by drive means supported on the top plate of the cylindrical closure.

Further description of the invention is facilitated by reference to the accompanying drawings.

Figure 1:
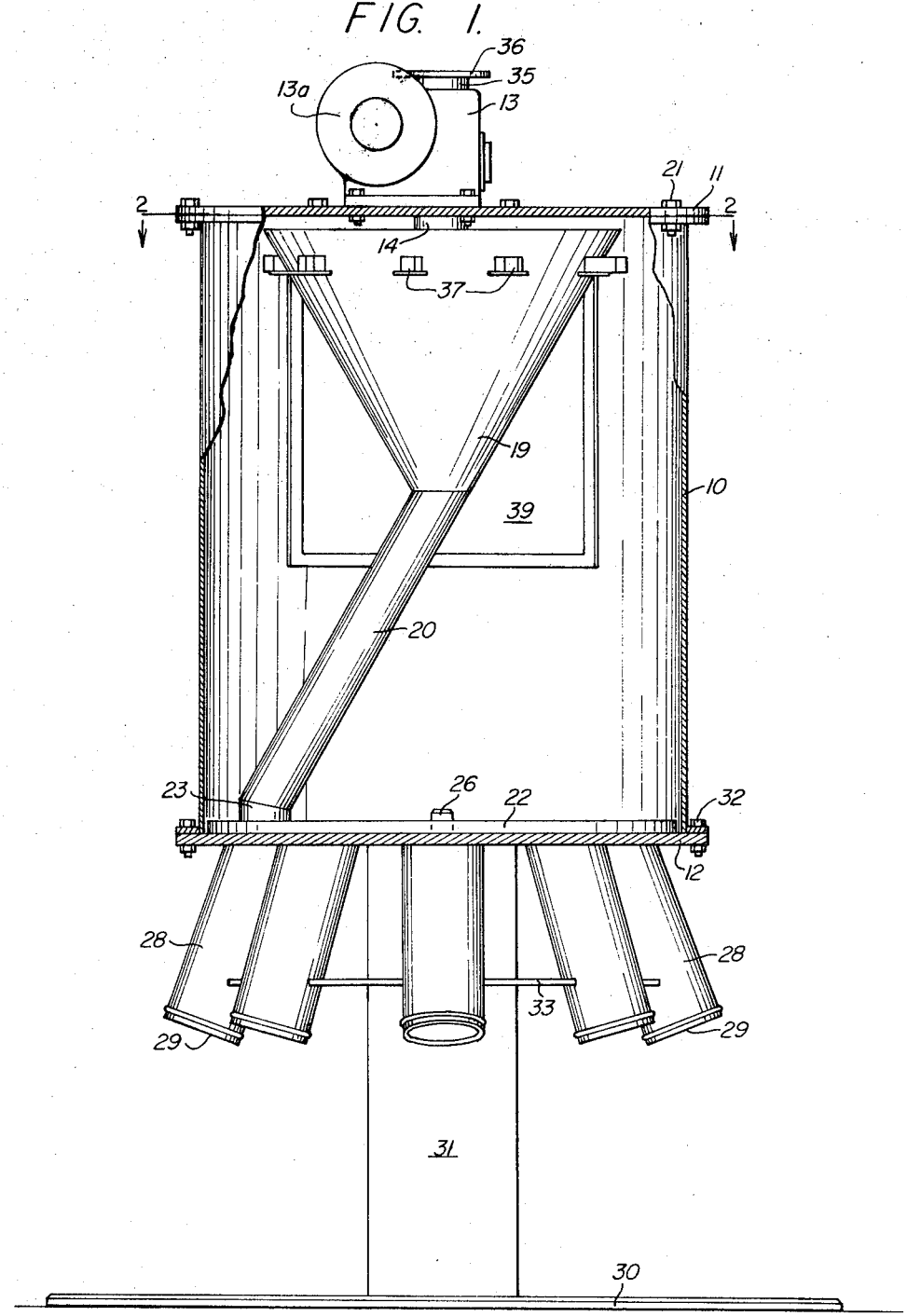
FIG. 1 is a fragmented, sectional, elevational view of a rotary sample collector.
Figure 2:
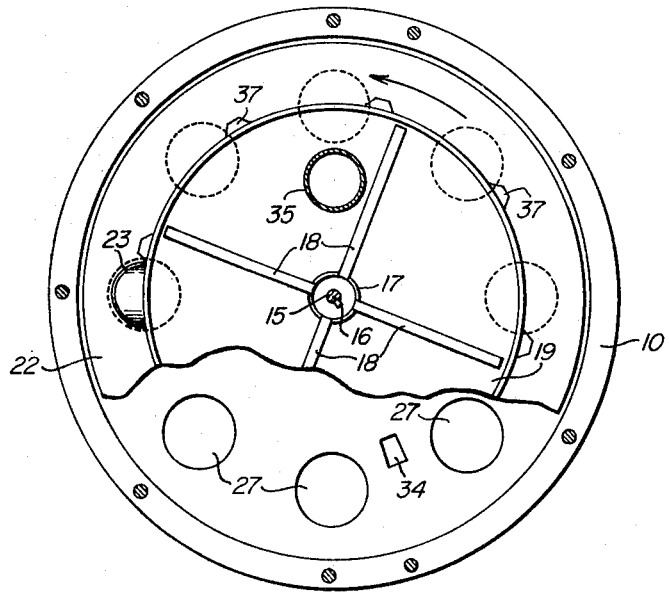
FIG. 2 is a sectional, fragmented, planar view of the collector along section lines 2—2 of FIG. 1.

The collector is shown in FIG. 1 in its normal vertical position. The outer housing 10 is illustrated as a cylindrical housing having top and bottom openings which are closed by a top flange 11 (top plate) and a base flange 12 (bottom plate). The top flange 11 supports a drive mechanism 13 which has a support bearing 14 which supports the drive axle 15 (FIG. 2). The drive axle 15 has a keyway 16 and is keyed to hub 17 from which four spanners 18 radiate to attach to the hopper wall to support the inverted cone-shaped hopper 19.

The inverted cone-shaped hopper 19 is suspended from and rotated by axle 15. The axle 15 is located concentrically above hopper 19 and extends axially along the central longitudinal axis of hopper 19. Axle 15 is also preferably concentric with cylindrical housing 10. The outer housing 10 is stationary while the inner hopper 19 rotates relative thereto. The support bearing 14 is secured to either the top plate 11 or the drive mechanism 13. Support bearing 14 is a thrust bearing through which the axle 15 passes. The support 14 bears the weight of hopper 19 and conduit 20 which is transmitted thereto by axle 15.

There are advantages in suspending the inverted cone hopper 19 from the top flange 11 of cylindrical closure 10 inasmuch as a base thrust bearing and support extending upwards from the base to the hopper 19 are not required. Because the tubular elongated conduit 20 extends downwardly from the apex of the inverted cone-shaped hopper 19 at a substantial angle from the vertical to a point near the inner perimeter of the cylindrical enclosure, the hopper 19 and conduit 20 are generally not balanced about the central vertical axis of the hopper. Therefore, the bearing 14 must have bearing surfaces and supports for resisting lateral forces thereon. It is, of course, possible to intentionally add weights to the cone-shaped hopper 19 on the opposite side of the hopper from the extended conduit 20 to achieve a balanced hopper-conduit structure.

Other advantages of suspending the hopper from an overhead bearing include easy removal of the hopper 19 and conduit 20 by removing the fastening means such as bolts 21 which fasten the top plate 11 to the cylindrical enclosure 10 and lifting the whole hopper-conduit assembly from the enclosure 10. This permits easy repair and easy cleaning of the structure. These units are generally not so large that removal of the top plate, motor, drive mechanism, and hopper-conduit structure are so heavy that it cannot be easily accomplished with light block and tackle. A typical diameter of the cylindrical enclosure 10 is from about 18 to 36 inches with a generally convenient diameter of about 2 feet. It is understood, of course, that smaller and larger sizes may be desired and may be built according to the invention.

A disc seal 22 rides on the base 12 and has a circular opening offset from the center thereof for receiving the discharge end of conduit 20. The discharge end 23 of conduit 20 may be fixedly attached to the disc seal 22 or the discharge end 23 of conduit 20 may merely fit within the circular opening 24 of the disc seal 22 without the conduit 20 and the seal 22 being attached to one another. It is preferred, of course, that the fit between opening 24 and conduit 20 be sufficiently tight to prevent an excessive amount of dust from passing between the discharge end 23 and the walls of opening 24.

The disc seal 22 may be designed with substantially the same maximum diameter as the cylindrical enclosure 10 and be rotated therein by the rotation of discharge end 23 of conduit 20. However, as shown in the drawings, it is preferred to have a central opening 25 in the disc seal 22 which fits over a cylindrical stud 26 centrally projecting upwards from the inside of base plate 12 and to hold the disc seal 22 in position and to provide an axle about which the disc seal 22 rotates. A lock nut may be provided on stud 26 to prevent it from being dislodged therefrom, however, the seal 22 is generally free to move axially along the stud for a short distance. Also, the diameter of the disc seal 22 is preferably slightly less than the inside diameter of cylindrical enclosure 10.

The disc seal 22 functions to prevent loss of moisture or other volatile substances from a sample and further prevents contamination by dust flowing from the open sample station to another sample station. This is especially desirable to insure the integrity of each sample. Disc seal 22 is efficient and simple in operation inasmuch as it is driven by conduit discharge end 23 and maintains a sealing contact with the upper surface of base flange 12 by the weight of the disc seal 22. As indicated hereinabove, disc seal 22 maintains contact with base flange 12 through its own weight and is preferably not held tightly against said base flange by lock nuts or the like.

The disc seal 22 slides on base flange 12 as it rotates. Base flange 12 has a plurality of circular openings through which granular material flows from conduit 20 to individual collection stations. In FIG. 2 eight circular openings 27 are shown in solid and phantom lines. One circular opening 27 is provided for each collection station. Although any number of collection stations can be provided, eight stations provide an individual station for each hour of an 8 hour shift. The circular openings 27 are spaced from one another and are located along the circumference of a circle which has its center preferably at the center of base flange 12. The circle upon which circular openings 27 are disposed corresponds substantially identically with the circle circumscribed by discharge end 23 of conduit 20 during rotation of said discharge end.

In FIG. 1 tube members 28 are secured to base flange 12 to correspond with the openings 27 in said base flange 12. The eight tube members 28 are each slightly inclined away from the central vertical axis of the collector. The fanning-out of the tube members 28 permits easier attachment of collection bags to the lower end 29 of tube members 28. The angle of incline of tube members 28 between the tube member 28 and the base flange should not be less than the angle of the repose of the granular material being sampled. An angle of at least 45° to the base flange 12 is generally required and a minimum angle of 60° is preferred. The same is true of conduit 20 and the walls of hopper 19. If the slope of any of the aforesaid elements is less than the angle of repose of the material then the possibility exists of contamination of a sample with material from a previously collected sample. One of the significant advantages of the invention disclosed herein is the substantial elimination of sample contamination by simple means in a compact sample collector.

The sample bags usually attached to the lower portion of tube members 28 are not shown in the drawings attached hereto. These sample bags may be any convenient type of bag although moisture impermeable bags of clear plastic are preferred to retain sample moisture and to permit visually determining that a sample has been collected. The mouth of the collection bags should be tightly secured around the lower portion of tube members 28 to maintain sample integrity. The bags may be secured by rubber bands or adjustable metal bands or similar means. The size of the collection bag used depends upon the size of sample collected. Typical sample bags for collecting dry granular materials have a volume of between about 0.1 cubic foot and 1.0 cubic foot.

A flat pad 30 and single pedestal 31 are shown supporting the housing 10. The pad is shown in FIG. 1 only and is a large circular disc supporting pedestal 31 at the center of the disc. The pad 30 and pedestal 31 are preferably steel members welded together to form a support structure for the collector. The upper end of pedestal 31 is rigidly affixed to the underside of base flange 12. Base flange 12 is rigidly attached to the cylindrical housing 10 by bolts 32 or other similar fastening means. The pedestal 31 also supports a disc-shaped web 33 which braces tube members 28. The disc-shaped web 33 has a central opening through which pedestal 31 passes. The disc-shaped web 33 is secured to pedestal 31 and extends radially therefrom to partially enclose each tube member 28 to assist in maintaining the orientation of each tube member. Web 33 may be eliminated from the structure, especially when tube members 28 are very short.

Pad 30 preferably has a diameter substantially greater than the diameter of housing 10. Pedestal 31 may be any desired length although the shortest length consistent with providing sufficient space for collection bags is desired. These structural provisions give the collector maximum stability. Pad 30, of course, may be fastened to a sub-support to add structural support and/or stability.

FIG. 2, in addition to showing the structural relation of hub 17, elongated web members 18 and hopper 19, also illustrates the equidistant spacing between adjacent circular openings 27. Also shown in FIG. 2 is waste slot 34 which provides an opening in base flange 12 for discharge of material which gathers between the bottom surface of disc seal 22 and the top surface of base flange 12. More than one waste slot 34 is preferably provided in the base flange 12.

The top surface of base flange 12 is preferably machined to make effective contact with the bottom surface of disc seal 22. Granular material collecting therebetween would soon cause an inefficient seal to occur. Therefore, slots 34 are provided to permit discharge of this unwanted material. The disc seal 22 is preferably constructed of high density plastic although metals or other materials of construction could be utilized.

Figure 3:
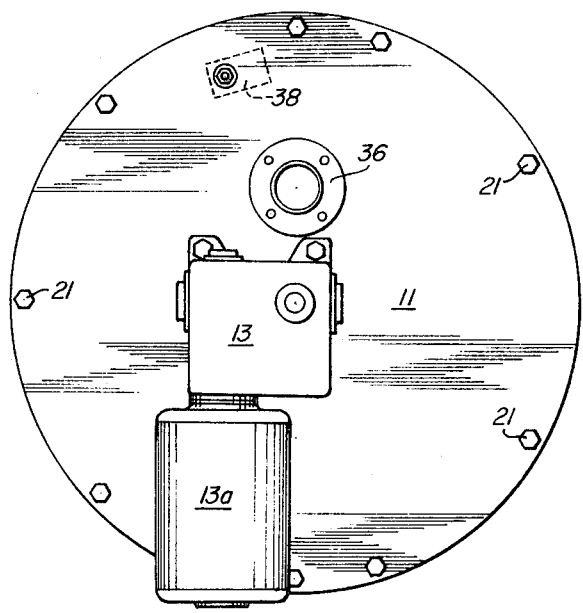
FIG. 3 is a planar view of the collector top plate.
Figure 4:
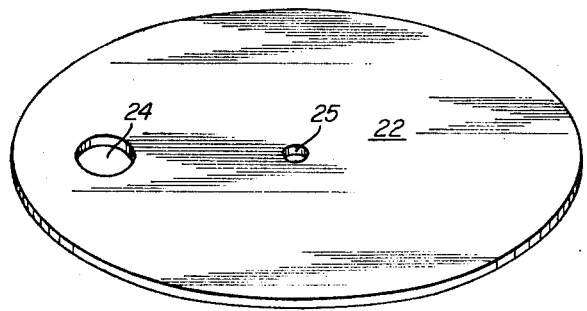
FIG. 4 is a perspective view of the disc seal.

Also shown in FIG. 2 is the cross-section of hopper feed pipe 35 which projects a short distance into the hopper 19 below top flange 11. Feed pipe 35 projects into hopper 19, only a short distance and not so far as to interfere with web members 18 during their rotation. The hopper feed pipe flange 36 is shown in FIGS. 1 and 3 above the top flange 11. Samples of granular material periodically obtained from a storage pile, rail cars, conveyor belt or the like is introduced into the rotary sample through feed pipe 35. From feed pipe 35 the material drops into hopper 19 and flows through conduit 20, through a preselected opening 27 in base flange 12, through tube member 28 to a sample bag.

When the granular material drops from feed pipe 35 into hopper 19 some fine material may blow back and form a cloud of fine dust which floats over the upper rim of hopper 19 and ultimately settles upon the top of disc seal 22 or at the inside perimeter of base flange 12. This "blow-back" of fine dust may be prevented from overflowing the upper rim of hopper 19 by providing a cylindrical flap seal attached to the lower surface of top flange 11 and projecting into hopper 19 a short distance. The diameter of the flap seal should be approximately the same as the diameter of the rim of hopper 19 so that it will gently contact the inner surface of the hopper 19. The cylindrical flap seal may be constructed of rubber, cloth or similar material.

Cam members 37 are illustrated in FIGS. 1 and 2 as small projections located equidistantly about the outer perimeter of hopper 19 a short distance below the upper rim thereof. These cam members 37 engage a limit switch 38, shown in phantom in FIG. 3, which initiates functioning of the collector. The purposes of the limit switch 38 and cam members 37 are explained more fully hereinafter.

OPERATION OF ROTARY SAMPLE COLLECTOR

The hopper 19 is driven by drive mechanism 13 which is preferably a gear reducer which reduces output of motor 13a from about 3,600 rpm to about 10 to 30 rpm. Motor 13a may be energized through a manually operated switch to turn the hopper 19 the prescribed number of degrees to move conduit discharge end 23 from one collection station to the next. Whenever eight stations are utilized they are located 45° apart. A visual indicator, such as a pointer, can be fixedly attached to axle 15 and aligned with conduit discharge end 23 so that an operator manually operating the collector can visually determine when the conduit discharge end 23 has moved to the desired collection station.

Although the rotary sample collector functions satisfactory when manually operated, it is generally desirable to provide it with automatic functions. One simple and efficient manner of automatically operating the collector is shown in the attached drawings. Cam members 37 project a small distance radially from hopper 19. (These cam members may be constructed so that they may be adjusted laterally, i.e., along the circumference of the hopper, a small amount so that the cam member is in the proper location to provide for alignment of conduit discharge end 23 with the preselected opening 27.) Rotation of hopper 19 causes cam member 37 to engage limit switch 38, which is electrically connected to a switch in the power supply to motor 13a. Limit switch 38 upon contact by a cam member 37 shuts off power to motor 13a and stops rotation of hopper 19 and conduit 20. By proper location of limit switch 38 the power is switched off motor 13a just as conduit discharge end 23 becomes aligned with the next unfilled collection station. Limit switch 38 may be adjustable with reference to the base flange to provide the desired contact with cam members 37.

Power may be supplied periodically to motor 13a either manually or by a master timed mechanism. In either case, the limit switch 38 controls the function of switching off power to motor 13a. The electrical circuit for operating the collector automatically is not illustrated, however, it is well known to use relay switches which lock in their own current to maintain the relay switch in a closed position after being energized by an independent source of current. Such a relay can be attached to a timer (or manual switch) which periodically supplies current, for example, once an hour, for a short duration to close such a relay switch which thereupon energizes its own coil and continues to supply current to motor 13a until the circuit supplying electrical energy to the coil of the relay switch or to the motor is broken by opening of another switch in such circuit. The automatic terminating of power to the relay switch coil or to the motor is the function of limit switch 38. For example, cam member 37 contacts limit switch 38 causing it to open the circuit to the coil of the relay switch. The relay switch opens and power is discontinued to motor 13a and the collector stops rotating. Cam member 37 stays in contact with limit switch 38 which remains in an open position.

Rotation of the hopper 19 is automatically recommenced by the master timer supplying power to the coil of the relay switch and to the motor through a circuit parallel to the limit switch circuit for a period sufficiently long to cause sufficient rotation of hopper 19 to cause cam member 37 to disengage limit switch 38 thereby allowing limit switch 38 to close the circuit to the coil of the relay switch and to the motor. Once limit switch 38 is closed it does not reopen until the next cam is contacted, at which time switch 38 opens and terminates rotation of hopper 19.

Other electrical circuits, of course, can be devised for automatically initiating and terminating rotation of hopper 19 so that the conduit discharge end 23 accurately aligns itself with a succeeding collection station after a sample has been provided to the previous collection station.

Another means of sequentially advancing the conduit 20 of hopper 19 to succeeding collection stations comprises inclusion of an electric switch in each of the discharge tube members 28, which switch is activated by the granular material flowing therethrough. Activation of such a switch causes the circuit of motor 13a to be closed, thereby advancing the conduit discharge end 23 to the next collection station. It is preferred that such switches activate motor 13a through a time-delay switch to allow sufficient time for all the material from hopper 19 to flow through a particular tube member 28 before the hopper begins to rotate. Activation switches in the discharge tube member 28 could be used in place of or in addition to a remote master timer switch of the type previously discussed.

Remote monitoring of the rotary sample collector can be readily accomplished by providing individual indexing limit switches near each collection station (circular opening 27) on the upper surface of the base flange 12 so that conduit discharge end 23 contacts the individual index switches while the conduit discharge end 23 remains at that station. Each indexing switch is connected to a separate light on a remote panel board to indicate which collection station is open to conduit 20.

The apparatus described herein is particularly advantageous for collecting dry granular samples. The apparatus is more compact than linear sample collectors and provides an efficient, uncomplicated sealing mechanism to isolate all other collection stations from the open collection station.

The apparatus is further advantageous inasmuch as it is easily maintained through access door 39 which effects a dust proof seal with closure 10 but allows ready access to the interior of closure 10 when said door is open.

The apparatus has a minimum of moving parts and has only one part, the drive means 13, which requires lubrication. The suspension of the rotating hopper and conduit from a single overhead axle provides a system which is reliable in operation and easily maintained.

The described rotary sample collector is particularly advantageous in that it maintains maximum sample integrity and minimizes sample contamination. This is especially true when all sloped members have an angle with respect to the horizontal of at least 60°. To further enhance this characteristic of the collector, it is preferred that no welds or ridges be present on any surface contacted by the granular materials.

Although the invention has been described herein by reference to specific embodiments, it is not intended to be limited thereto, but to include all the variations and modifications falling within the scope of the appended claims.

I claim:

1. A rotary sample collector for dry granular material comprising:
   a. an external closure, said closure having flat, plate-like upper and lower flange members;
   b. an inverted conical hopper enclosed in said external closure, said inverted conical hopper having a larger upper opening and a smaller discharge opening at its apex;
   c. drive means for rotating and supporting said conical hopper, said drive means being concentric with said conical hopper and supported by said upper flange;
   d. bearing means externally located on said upper flange for providing bearing support for said drive means;
   e. tubular conveying means communicating with said conical hopper discharge opening at its upper end and at its lower end selectively communicating with one of a plurality of openings in the lower flange of said external closure;
   f. a plurality of spaced openings in said flat, plate-like lower flange near the perimeter thereof, said plurality of openings located on the circumference of a circle which has its center directly below said concentric drive means;
   g. a plurality of short, sample discharge tube members projecting externally below said lower flange, each of said tube members communicating with one of the plurality of spaced openings in said lower flange, said sample discharge tube members adapted to receive a sample bag about their lower ends.
   h. rotatable disc seal means having an opening communicating with said tubular conveying means and sealingly covering the plurality of spaced openings in said lower flange, except for the opening with which said tubular conveying means is communicating.

2. The rotary sample collector of claim 1 wherein the inverted conical hopper is suspended by drive means from said upper flange.

3. The rotary sample collector of claim 1 wherein the upper surface of said lower flange which is in contact with said rotatable disc seal is a flat, machined surface.

4. The rotary sample collector of claim 1 wherein the plurality of spaced openings in said lower flange are circular openings.

5. The rotary sample collector of claim 1 wherein lower flange has a plurality of spaced waste slot openings.

6. The rotary sample collector of claim 1 wherein the external closure is a cylindrical structure having a pair of flat plate like members forming the top and bottom of said closure.

7. The rotary sample collector of claim 1 wherein the hopper is attached to said concentric drive means by an axle and hub with radial web-like members extending from said hub to said hopper.

8. The rotary sample collector of claim 1 wherein the hopper walls and tubular conveyor means each have a minimum slope of 60° with the horizontal.

9. The rotary sample collector of claim 1 wherein the rotatable disc seal means has a circular opening near the periphery of said disc, said circular opening being of sufficient size to encompass the lower end of said tubular conveying means.

10. The rotary sample collector of claim 9 wherein the rotatable disc seal means is a high density plastic disc.

11. The rotary sample collector of claim 1 wherein the tubular conveyor is sequentially rotated to succeeding individual sample collection stations by means comprising remote energizing means to initiate operation of said drive means and switch means cooperating with cam means associated with said hopper to terminate rotation of said tubular conveyor at a selected collection station.

12. The rotary sample collector of claim 11 wherein the number of individual cam means associated with said hopper is the same as the number of individual sample collection stations present.

* * * * *